(12) United States Patent  
Gretta et al.

(10) Patent No.: US 7,985,280 B2  
(45) Date of Patent: Jul. 26, 2011

(54) SEPARATION OF AQUEOUS AMMONIA COMPONENTS FOR $NO_x$ REDUCTION

(75) Inventors: William Gretta, Clinton, NJ (US); Eric Pear, Bridgewater, NJ (US); Dileep Karmarkar, Warren, NJ (US)

(73) Assignee: Hitachi Power Systems America, Ltd., Basking Ridge, NJ (US)

( * ) Notice: Subject to any disclaimer, the term of this patent is extended or adjusted under 35 U.S.C. 154(b) by 951 days.

(21) Appl. No.: 11/677,038

(22) Filed: Feb. 20, 2007

(65) Prior Publication Data

US 2008/0196588 A1 Aug. 21, 2008

(51) Int. Cl.  
*B01D 19/00* (2006.01)

(52) U.S. Cl. .............. 95/159; 95/162; 95/164; 95/167; 95/168; 95/191; 95/207; 95/263; 95/264; 422/285; 422/288; 96/202

(58) Field of Classification Search ........... 95/149–240, 95/241–266; 423/201–248; 422/243–309; 96/155–220, 243–371  
See application file for complete search history.

(56) References Cited

U.S. PATENT DOCUMENTS

| | | | |
|---|---|---|---|
| 3,344,585 A | 10/1967 | Hollowell | |
| 4,058,375 A | 11/1977 | Lawrence | |
| 4,115,515 A | 9/1978 | Tenner et al. | |
| 4,911,900 A | 3/1990 | Horch et al. | |
| 4,980,137 A * | 12/1990 | Nelson et al. | 423/239.1 |
| 5,069,886 A | 12/1991 | Frey et al. | |
| 5,098,680 A | 3/1992 | Fellows et al. | |
| 5,240,688 A * | 8/1993 | von Harpe et al. | 423/235 |
| 5,282,355 A | 2/1994 | Yamaguchi | |
| 5,296,206 A | 3/1994 | Cho et al. | |
| 5,437,851 A | 8/1995 | MacInnis | |
| 5,525,317 A | 6/1996 | Bhat et al. | |
| 5,820,838 A | 10/1998 | Tsuo et al. | |
| 6,019,068 A | 2/2000 | Tsuo et al. | |
| 6,093,380 A * | 7/2000 | Lagana et al. | 423/239.1 |
| 6,146,605 A | 11/2000 | Spokoyny | |
| 6,264,905 B1 | 7/2001 | Spokoyny | |
| 6,325,985 B1 | 12/2001 | Koshinen et al. | |
| 6,403,046 B1 | 6/2002 | Spokoyny | |
| 6,436,359 B1 | 8/2002 | Spencer, III et al. | |
| 6,599,119 B1 | 7/2003 | Wood et al. | |
| 6,601,385 B2 | 8/2003 | Verdegan et al. | |
| 6,616,901 B1 | 9/2003 | Lagana et al. | |
| 6,620,393 B2 | 9/2003 | Spokoyny | |
| 6,694,900 B2 | 2/2004 | Lissianski et al. | |
| 7,069,715 B1 | 7/2006 | Childers | |
| 7,090,810 B2 | 8/2006 | Sun et al. | |
| 2004/0118126 A1 * | 6/2004 | Ong et al. | 60/780 |
| 2004/0120872 A1 | 6/2004 | Fan et al. | |
| 2004/0197251 A1 | 10/2004 | Williamson | |
| 2006/0242970 A1 | 11/2006 | Yang et al. | |

* cited by examiner

*Primary Examiner* — Duane Smith  
*Assistant Examiner* — Thomas McKenzie  
(74) *Attorney, Agent, or Firm* — Straub & Pokotylo; Michael P. Straub; Ronald Straub

(57) ABSTRACT

Methods and apparatus for generating a vapor to be injected into a flue gas stream are described. Apparatus comprises a fluid vaporization and injection assembly further comprising: a stripper for producing first ammonia vapor and a first aqueous ammonia solution from a second aqueous ammonia solution; a reflux tank for producing a second ammonia vapor and the second aqueous ammonia solution from the first ammonia vapor and the first aqueous ammonia solution; and a first outlet for outputting the second ammonia vapor for introduction into the flue gas.

26 Claims, 5 Drawing Sheets

SEPARATION OF AQUEOUS AMMONIA COMPONENTS FOR $NO_x$ REDUCTION

RELATED APPLICATIONS

The present application describes subject matter which is related to, and or can be used with, the subject matter described in U.S. patent application Ser. No. 11/677,036, filed on the same date as the present application and titled "AMMONIA VAPORIZATION SYSTEM USING NON-FLUE GAS INTERMEDIATE HEAT TRANSFER MEDIUM" which names the same inventors as the present application and which is hereby expressly incorporated by reference.

FIELD OF THE INVENTION

This invention relates to vaporization systems including, for example, ammonia vaporization systems used for injection of ammonia into flue gas streams.

BACKGROUND OF INVENTION

One of the byproducts of power plants and turbine engines is exhaust gas, commonly known as flue gas. This gas may contain components which are harmful to the environment, such as oxides of nitrogen ($NO_X$). The production of $NO_X$ can occur when fossil fuels are combusted, such as in turbines, refinery heaters, steam boilers, etc. Such fuels include coal, oil, natural gas, waste product such as municipal solid waste, petroleum coke, and other carbon-based materials. It is beneficial to the environment to control the levels of $NO_X$ released into the atmosphere by burning such fuels.

One common approach to handling this situation is to inject a reducing gas into the flue gas stream, which will remove $NO_X$, from the stream. One common method is a selective catalytic reduction (SCR) process which involves the injection of ammonia ($NH_3$) into the flue gas stream and then passing the resultant flue gas over a catalyst. The flue gas and the ammonia regent travel through a catalytic converter that facilitates the breakdown of $NO_X$ into nitrogen ($N_2$), oxygen ($O_2$), and water, which are not harmful to the atmosphere.

One known method for generating ammonia vapor uses anhydrous ammonia, which is evaporated with either a direct electric heat source or with steam coils directly supplying the heat to the ammonia. The vaporized ammonia is then diluted with air in order to provide an adequate mass necessary to distribute the ammonia reagent evenly over a large ductwork cross-section. A disadvantage of such a system is the need for maintenance of the electric or steam coils as they are in direct contact with the anhydrous ammonia. Further, any breach of the steam coil could result in ammonia contamination of the steam system.

Another known method of generating ammonia vapor is to use a selective non-catalytic reduction process (SNCR) wherein a liquid aqueous ammonia derivative is sprayed into a high temperature region of the furnace in order to accomplish $NO_X$ reduction. In some systems the energy from the flue gas is used to accomplish the phase change. A major problem associated with this method of relying on the flue gas to supply the heat is that a long time is required in the hot region in order to vaporize the water and ammonia and for the reaction with the $NO_X$.

Another known method is to vaporize aqueous ammonia, and then inject the vapor into the flue gas stream at a location upstream of the SCR reactor. A known approach to heating the aqueous ammonia is to use a diverted portion of flue gas, to heat up the aqueous ammonia. A problem with this approach is that everything that the flue gas comes in contact with is contaminated, from such contaminates in the flue gas as dust, ash, and sulfur oxides. In addition, the amount of heat available for vaporization is a function of the flue gas temperature making control of vaporization more difficult than where the heat source can be readily controlled to supply differing amounts of heat depending on sensed operating conditions.

An undesirable byproduct of some systems is waste water which includes significant amounts of ammonia. From a cost and environmental standpoint high concentrations of ammonia in waste water can be undesirable. Ammonia that is discharged represents wastage of a reactant which could have been put to good use in the flue gas stream. In addition, waste water with high ammonia concentrations can be harmful is discharged into the environment. Accordingly, additional processing may be required to treat waste water with high ammonia concentrations. Such treatment can be costly.

In view of the above discussion, it should be appreciated that it would be useful if improvements in systems which are used to vaporize aqueous ammonia could be made. In particular it would be desirable if reductions in the concentration in the amount of ammonia included in waste water discharged from the system could be reduced and/or efficiencies in the way heat is used to vaporize aqueous ammonia could be obtained as compared to known systems. Thus, it should be appreciated that there is a need for new and improved ways of preparing an ammonia reagent with a relatively low level of water for injection into the flue gas stream of a furnace in order to reduce the level of $NO_X$ in the flue gas, while producing residual, e.g., waste water, with relatively low ammonia concentrations and/or which is free of ammonia.

SUMMARY OF THE INVENTION

The apparatus and methods of the invention are directed to generating an ammonia vapor. In some embodiments the ammonia vapor has relatively low water content, e.g., is substantially free of water, making it well suited for injection into a flue gas stream. The methods and apparatus of the invention can be used to generate and inject an ammonia vapor with a lower water concentration than some prior art systems. The relatively low amount of water can have the desirable advantage of resulting in less corrosion to the flue and associated equipment, including less scaling and/or sedimentary deposits.

Further, by reducing the water concentration as compared to some known systems, the ammonia vapor can be generated using less energy and/or at a lower temperatures and pressures, reducing the heating requirements of the vaporization process. Another advantage of the invention is that in some embodiments, the liquid solution output from the system may have a lower ammonia content than some other systems, e.g., the presence of ammonia may be reduced to a level that is virtually or actually merely trace amounts of ammonia in the waste water thereby allowing the water to be used elsewhere or disposed of without complicated environmental safety processing or using less processing that would be required if higher levels of ammonia were present.

In one exemplary embodiment, the apparatus comprises a stripper that is used to produce a first ammonia vapor and a first aqueous ammonia solution from a second aqueous ammonia solution from a reflux tank. The stripper does this by spraying the second aqueous solution down a structure through rising steam, causing separation of the second aqueous solution into the first aqueous solution and the first ammonia vapor. In some exemplary embodiments the apparatus also includes a reflux tank that is used to produce a second ammonia vapor and the second aqueous ammonia solution from the first ammonia vapor and liquid aqueous ammonia which serves as an input to the reflux tank. In the exemplary embodiment, the reflux tank generates and outputs the second ammonia vapor for introduction into the flue gas. Also, the first aqueous ammonia solution which has been heated, e.g., by steam, can be used to heat two heat exchangers, which are used respectively to heat incoming aqueous ammonia, e.g., liquid aqueous ammonia, to the apparatus, and to heat the second ammonia vapor before it is introduced into the flue gas, both processes aiding in the removal of water from the ammonia vapor.

By using multiple tanks and by using the first aqueous ammonia solution as the heat source for heating other elements of the system, energy efficiency can be achieved while producing ammonia vapor with relatively low concentrations of water included in the vapor and waste water with low concentrations of ammonia.

In some embodiments of the present invention, the flue gas is monitored for such attributes as NOx concentrations, flow rate, and temperature. Based on the information obtained from the monitoring, one or more control modules control the amount of vaporized ammonia injected into the flue gas stream.

In various embodiments of the present invention, a condenser is used to condense water out of the first ammonia vapor before it is introduced into the reflux tank.

To generate the steam used in the apparatus of the invention, a boiler can be placed in the furnace which is generating the flue gas, in order to more economically generate steam to be introduced into the stripper. In this manner, the heat from the furnace can be used to generate steam used to provide the heat used to generate the ammonia vapor injected into the flue gas.

Additional features and benefits of the present invention are discussed in the detailed description which follows.

DETAILED DESCRIPTION

The methods and apparatus of the present invention for vaporizing ammonia and injecting the vapor into a flue gas stream can be used with a wide range of furnace environments. For example, the invention can be used with power plants, refineries, or other instances of the use of turbine engines, heaters, steam boilers, etc. The invention removes substantially all water from vaporized ammonia for injection into flue gas. This reduced water content makes it easier to vaporize the ammonia (less heat is required than would be required to vaporize water), and the lower water content in the ammonia vapor reduces contamination and sedimentary buildups in the flue and associated equipment. Also, the liquid solution formed as a result of the inventive process is substantially free of ammonia, allowing it to be used as ordinary water in other parts of the plant, or for other purposes, and reducing the expense of treating and disposing of water with an otherwise higher concentration of ammonia.

Figure 1:
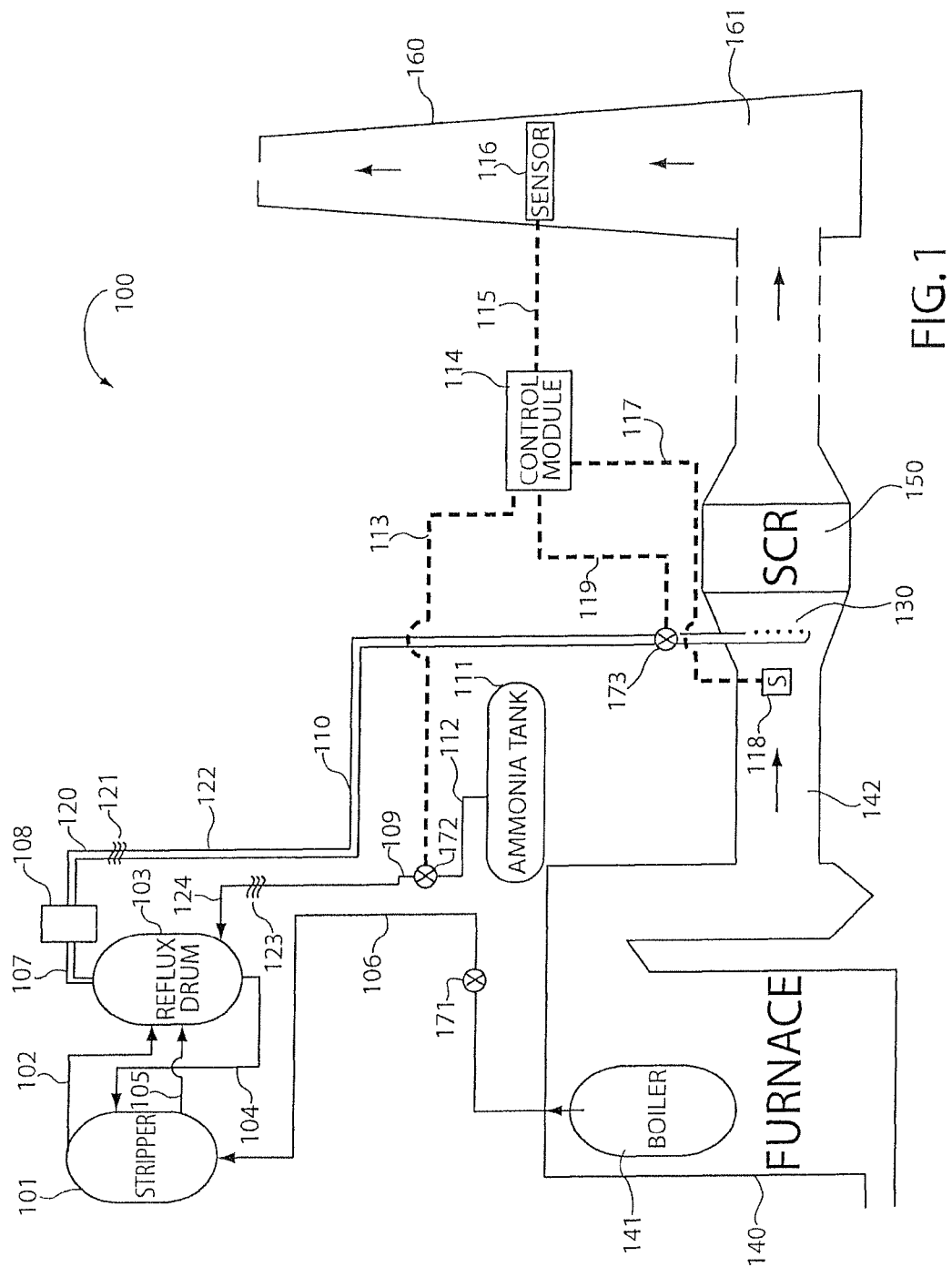
FIG. 1 illustrates a generating system including apparatus in accordance with the present invention.

FIG. 1 illustrates an exemplary system 100 implemented in accordance with the present invention, e.g., a power plant, which comprises a furnace, flue stack, SCR apparatus, and an ammonia vaporizing assembly.

The ammonia vaporizing assembly includes ammonia from ammonia tank 111, which is transported by pipe 112 through valve 172 and pipe 109, through heat exchanger 123, into inlet 124, into reflux drum 103. The ammonia from ammonia tank 111 is advantageously an aqueous solution of water and ammonia, sometimes referred to herein as liquid aqueous ammonia, in order to make the handling and transportation of the solution easier and safer. Typically, the ratio is 70% to 81% by weight water and 19 to 30% by weight ammonia. However, the ammonia could be in any state, with varying amounts of water.

Boiler 141 heats water (producing hot water or steam) which flows through pipe 106 and valve 171 into stripper 101. Of course, other methods of producing steam for use in stripper 101 are known, as well as the use of heat exchangers other than steam.

Stripper 101 (also known as an ammonia distillation column or stripper column) produces a first ammonia vapor and what will be referred to as a "first aqueous ammonia solution" (as distinct from the ammonia from ammonia tank 111, which may also be an aqueous ammonia solution, but which is referred to herein as "liquid aqueous ammonia").

Reflux drum 103 produces a second ammonia vapor and a second aqueous ammonia solution. The second aqueous ammonia solution serves as an input to the stripper 101 as described below.

Stripper 101 uses the second aqueous ammonia solution from reflux drum 103 via pipe 104, and steam from pipe 106, to produce the first aqueous ammonia solution which exits into pipe 105 to be delivered to reflux drum 103. The first ammonia vapor leaves stripper 101 via pipe 102 into reflux drum 103.

Reflux drum 103, which is used in a preferred embodiment, uses liquid aqueous ammonia from input 124, the first ammonia vapor from pipe 102, and the first aqueous ammonia solution from stripper 101 via pipe 105 to produce the second aqueous ammonia solution and the second ammonia vapor. While used in the preferred embodiment, the reflux drum 103 is not needed for some features of the invention and such features may be used in systems which do not include a reflux drum as well as systems which use a reflux drum as shown in the various examples discussed herein.

By transferring processed aqueous ammonia solution from stripper 101 to reflux drum 103 for further processing, and vice versa, the resultant aqueous ammonia solutions have further reduced levels of ammonia, and the resultant ammonia vapors have reduced levels of water.

The second ammonia vapor exits reflux drum 103 via pipe 107, through condenser 108, pipe 120, heat exchanger 121, and pipe 110, through valve 173 into injector ports 130 in flue 142, such that the injected vaporized ammonia mixes with the flue gas in flue 142 before reaching selective catalytic reduction (SCR) 150. Alternatively, or additionally, condenser 108 could be connected to the first ammonia vapor outlet 102 of stripper 101.

Again, by utilizing stripper 101 in combination with reflux drum 103, the resultant second ammonia vapor has a very low water content, which makes the injection process cleaner and more efficient, while the resultant second aqueous ammonia solution is relatively free of ammonia, allowing it to be used as water for certain applications. This reduces the need and expense of disposing of water with a high ammonia concentration, or taking further steps to reduce the ammonia concentration of the water.

Boiler 141 is positioned in furnace 140 such that furnace 140 provides heat to boiler 141, as well as heat for the primary purpose of the power plant 100. The resultant combustion gas from the furnace is directed by flue 142 to injector ports 130. After the $NO_X$ in the flue gas 161 has been converted to benign elements by the ammonia vapor injected by injector ports 130 and SCR 150, it is released to the atmosphere by stack 160.

Control module 114 may be connected to various sensors. The control module 114 may be implemented as a computer device which implements one or more control routines which may be implemented in software. The control module 114, in some embodiments, is coupled to and interacts with, a power plant control system. The various sensors coupled to control module 114 may include, for example, sensor 118 which is positioned in the flue at a point before where the ammonia vapor is introduced into the flue gas at injector ports 130. Sensor 118 is connected to control module 114 via link 117, and can determine such things as the concentration of $NO_X$ gases in the flue at that point, the rate of flow of the flue gas, or the temperature of the flue gas at that point.

Also, control module 114 is shown linked via link 115 to sensor 116 in stack 160. From this sensor, a determination can be made as to the level of $NO_X$ remaining in the flue gas just prior to leaving stack 160. Additional sensors can signal control module 114 providing it with such information as the concentration of water in pipes 102 and 107, or the concentration of ammonia in pipe 105.

From these or other similar inputs, control module 114 can operate valve 173 via link 119 to control the output of ammonia vapor reaching injector ports 130. Also, control module 114 can operate valve 172 over link 113 to control the amount of liquid aqueous ammonia feeding into reflux drum 103. Although not shown, control module 114 could be designed to control valve 171 to regulate the amount of hot water or steam entering stripper 101. Another example is to control heat exchangers 121 and 123. As will be described in more detail in relation to FIG. 2, other control functions could be controlled by control module 114, or similar devices.

Figure 2:
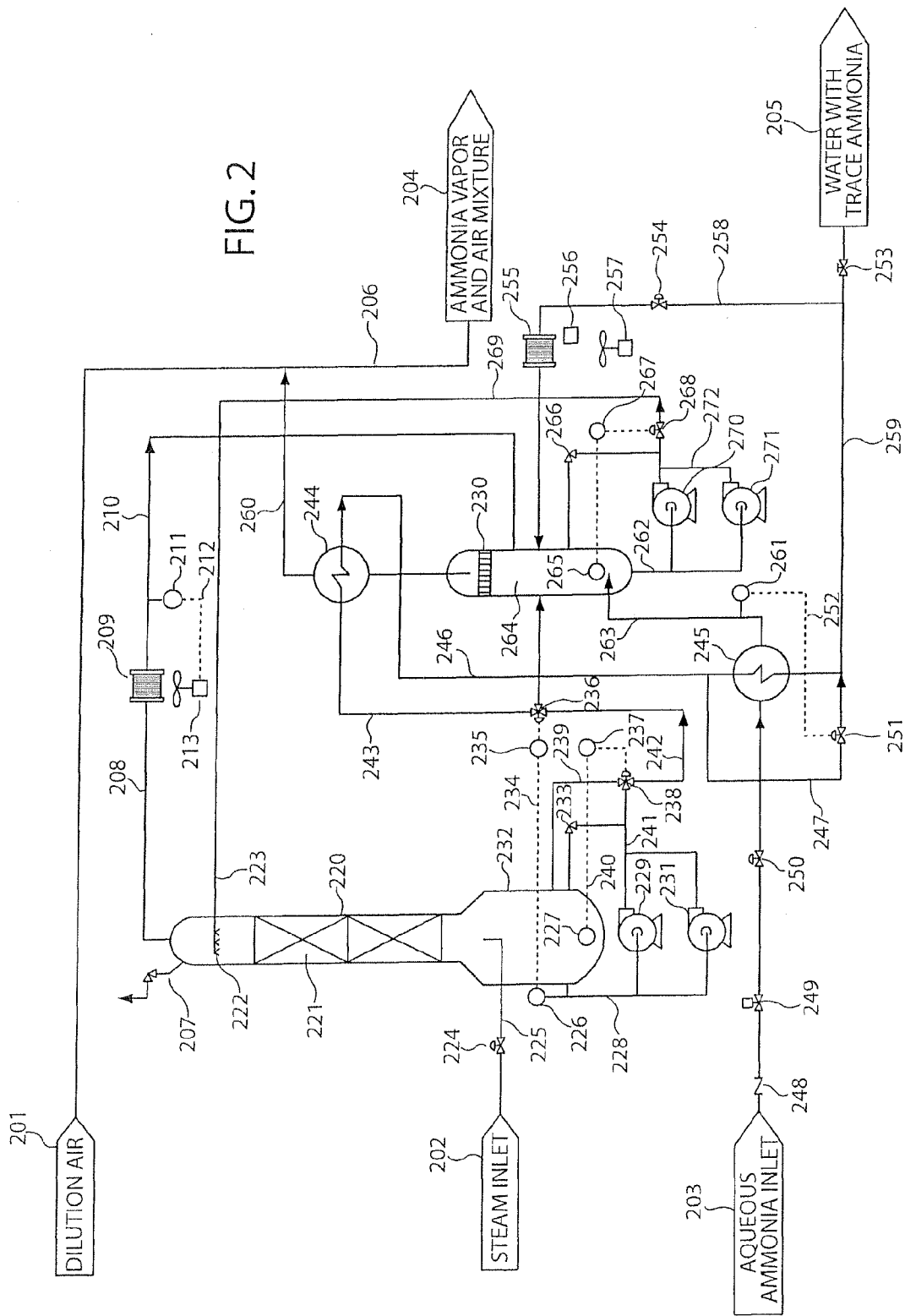
FIG. 2 illustrates an exemplary ammonia vaporization system implemented in accordance with the present invention.

FIG. 2 shows a more detailed view of an embodiment of the vaporization assembly of the present invention. Stripper 101 is shown as stripper column 220 and stripper holding tank 232. Steam is delivered to stripper holding tank 232 via valve 224 in pipe 225. The second aqueous ammonia solution arrives through pipe 223, and is injected into stripper column 220 via injectors 222. The second aqueous ammonia solution then runs down through packing material 221, where it mixes with steam rising from holding tank 232. Packing material 221 is advantageously metal or ceramic, forming a convoluted path with greater surface area for the second aqueous ammonia solution to trickle down, increasing its exposure to the rising steam. The steam mixes with the second aqueous ammonia solution to form the first ammonia vapor, which vents out pipe 208, where it passes through condenser 209. Fan 213 blows air over condenser 209 to assist in removing water from the first ammonia vapor, thereby reducing the water content of the vapor. Because water condenses at a higher temperature than ammonia, condenser 209 can be operated to condense water but not ammonia from the first ammonia vapor. The first ammonia vapor then travels through pipe 210 into reflux drum 264, which also comprises de-mister 230, allowing the second ammonia vapor to rise through de-mister 230 and exit via pipe 260, passing through heat exchanger 244, further vaporizing the second ammonia vapor prior to its being mixed with dilution air in pipe 206.

Also, liquid aqueous ammonia arrives from aqueous ammonia inlet 203, through check valve 248, solenoid activated valve 249, and control valve 250, through heat exchanger 235, and via pipe 263 into reflux drum 264. Because ammonia has a lower vaporization temperature than water, the liquid aqueous ammonia does not have to be heated to the point that water would have to be heated to vaporize, resulting in less required heat. Also, by controlling the heat, the vapor will contain some amount of water, which will cause less contamination, scale build-up, and corrosion of equipment through which the ammonia vapor passes.

The first aqueous ammonia from stripper holding tank 232 is formed as a result of the second aqueous ammonia solution dripping down over packing material 220 through the rising column of steam from pipe 225. Because of this stripping process, the first aqueous ammonia solution will contain more water and less ammonia than the second aqueous ammonia solution.

The first aqueous ammonia solution leaves stripper holding tank 232 via pipe 228, where pumps 229 and 231 pump it through pipe 241 to control valve 238. Control valve 238 can either send the first aqueous ammonia solution back into stripper holding tank 232 via pipe 239, or via pipe 242 to control valve 236. Check valve 233 can be used to maintain the fluid level in stripper holding tank 232.

Control valve 236 can direct the first aqueous ammonia solution to pipe 243 or route the solution directly into reflux drum 264. If the solution is diverted into pipe 243, it passes through heating unit 244. Because the first aqueous ammonia solution is hot from having mixed with steam in stripper holding tank 232 and column 220, the heat can transfer in heat exchanger 244 to pipe 260, which is transporting the second ammonia vapor.

The first aqueous ammonia solution would then pass from heat exchanger 244 through pipe 246 to either heat exchanger 245 or pipe 247 and control valve 251. If control valve 251 is closed, the pressure of the first aqueous ammonia solution would push all of it through heat exchanger 245, and as control valve 251 opened, more of the first aqueous ammonia solution would pass through pipe 247 and control valve 251. In this way, control valve 251 could control the amount of heat applied to heat exchanger 245 by the first aqueous ammonia solution. In either case, the first aqueous ammonia solution would then pass into pipe 259.

Similarly, control valves 253 and 254 can control the amount of the first aqueous ammonia solution which would pass from pipe 259 through control valve 253 into water with trace ammonia output 205 versus entering pipe 258 to pass through control valve 254 and condenser 255 into reflux drum 264. This determination could be based upon the level of ammonia left in the first aqueous ammonia solution, with control valve 254 closing and control valve 253 opening if the level is low, and the reverse if the level is high. If the first aqueous solution is passed back into reflux drum 264, more ammonia will be removed thereby, and even more ammonia will be removed by stripper column 220. Water passing through water with trace ammonia output 205 can be made to contain such a small concentration of ammonia, that the water can be used for many ordinary purposes, without harming the environment.

Condenser 255 also utilizes louvers 256 and fan 257 to assist in and control the amount of the removal of water from the first aqueous ammonia solution before it enters reflux drum 264, which would aid in the process of separating out ammonia vapor from the first aqueous ammonia solution in reflux drum 264.

The second aqueous ammonia solution produced in reflux drum 264 exits through pipe 262, and is pumped by pumps 270 and 271 into pipes 272 and 223 to stripper column 220. Check valve 266 can be used to maintain the fluid level of reflux drum 264.

The second ammonia vapor produced by reflux drum 264 passes through de-mister 230 into pipe 260, which passes through heat exchanger 244, which heats the second ammonia vapor for more efficient use when injected into the flue gas stream. De-mister 230 can be implemented as a series of baffles used to prevent liquid carry over. Because the second ammonia vapor is relatively free of water, the temperature required to achieve full vaporization is lower, and therefore less heating energy is required for this process. Also, due to the reduced amount of water in the second ammonia vapor, less contamination of equipment in the flue, such as injector ports 130 and SCR 150 of FIG. 1. The injection ports 130 maybe implemented, for example, as holes in one or more pipes. The ports 130 are used to inject the vaporized fluid which may have been mixed with some or all of the heat transfer media, e.g., air, into the flue gas stream.

The second ammonia vapor mixes in pipe 206 with dilution air 201 to add volume to the second ammonia vapor prior to exiting through ammonia vapor and air mixture. 204, which leads to pipe 110 of FIG. 1 for injection into the flue gas stream. By increasing the volume of the second ammonia vapor by combining it with dilution air, the rate of injection into the flue gas stream can be more readily controlled.

In general terms, when separating vapor from an aqueous ammonia solution in reflux drum 264, since ammonia vaporizes at a lower temperature than water, the vapor has a higher concentration of ammonia and a lower concentration of water, while the resultant aqueous ammonia solution will have a lower concentration of ammonia and a higher concentration of water. By then further processing the resultant aqueous ammonia solution in stripper column 220, more ammonia is removed from the solution, resulting in a solution with more water concentration and less ammonia concentration. The ammonia vapor from stripper column 220 is routed through condenser 209, which removes even more water from the vapor (again, because the condensation temperature of water is higher than the condensation temperature of ammonia), and then is routed into reflux drum 264, which removes more water from the ammonia vapor, and results in an aqueous solution with less ammonia.

A control module (not shown) can control various parts of the ammonia vaporizer. For instance, sensor 226 can measure attributes of the first aqueous ammonia solution leaving stripper holding tank 232 in pipe 228, and signal module 235 over link 234 to operate control valve 236. As an example, if the first aqueous ammonia solution is over a set temperature, control valve 236 could be set to direct the first aqueous solution into pipe 243 to heat both heat exchanger 244 and heat exchanger 245.

Sensor 227 could measure the level of ammonia in the first aqueous ammonia solution in stripper holding tank 232, and if the level was too low, a signal over link 240 to module 237 could cause control valve 238 to divert the first aqueous ammonia solution back into stripper holding tank 232 via pipe 239. Otherwise, the first aqueous ammonia solution could be directed through pipe 242 to control valve 236.

If module 211 senses that the water content in the first ammonia vapor is too high, it could signal via link 212 to increase the speed of fan 213, thereby increasing the effectiveness of condenser 209 in removing water from the first ammonia vapor.

Module 261 could determine the temperature of the liquid aqueous ammonia in pipe 263, and signal over link 252 to control valve 251 to open if the temperature is too high, or close if the temperature of the liquid aqueous ammonia is too low, for example. Control valve 251 would thereby cause more or less hot first aqueous ammonia solution to enter heat exchanger 245, which heats the incoming liquid aqueous ammonia in pipe 263.

Sensor 265 in reflux drum 264 could determine the ammonia content of the second aqueous ammonia solution as it leaves via pipe 262. If the ammonia content is too high, module 267 could cause control valve 268 to close, thereby forcing the second aqueous ammonia solution through check valve 266 back into reflux drum 264, in order to remove more ammonia vapor from the solution.

Those skilled in the art could utilize sensors and modules in many other similar ways to control the ammonia vaporization process of the present invention.

Figure 3:
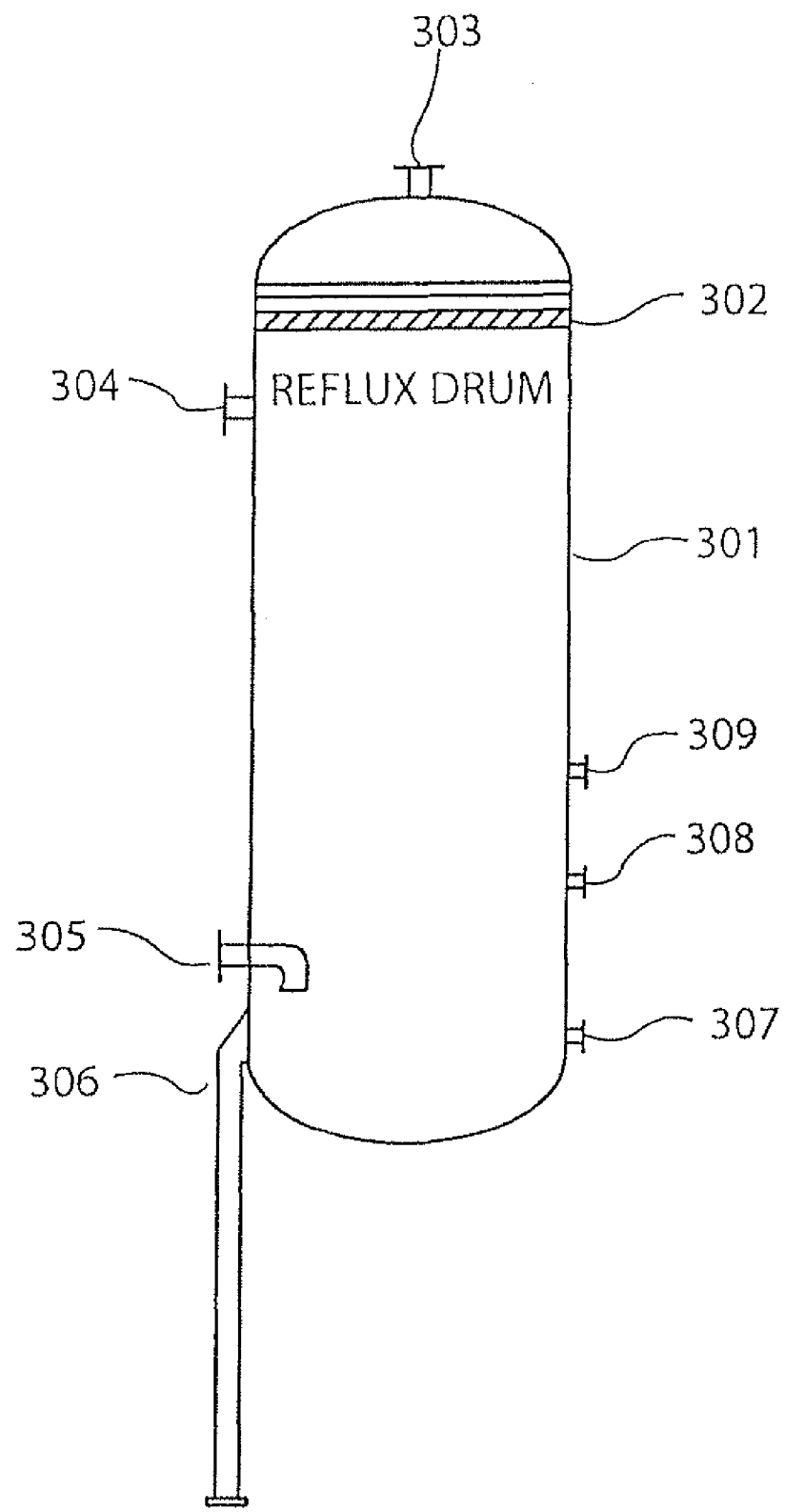
FIG. 3 illustrates an exemplary reflux drum implemented in accordance with the present invention.

FIG. 3 shows an exemplary reflux drum 301. Outlet 303 is used to output the second ammonia vapor after it passes through de-mister 302. Inlet 304 is used to input the first aqueous ammonia solution from stripper column 220 of FIG. 2. Inlet 305 may be used to input liquid aqueous ammonia. Outlet 306 may be used to output the second aqueous ammonia from reflux drum 301 to stripper column 220. Outlet 307 is connected to check valve 266 of FIG. 2, to maintain the fluid level in reflux drum 301. Inlet 308 is an alternate input for the first aqueous ammonia solution from stripper column 220, after passing through condenser 255 of FIG. 2. Inlet 309 receives the first ammonia vapor from stripper column 220.

Figure 4:
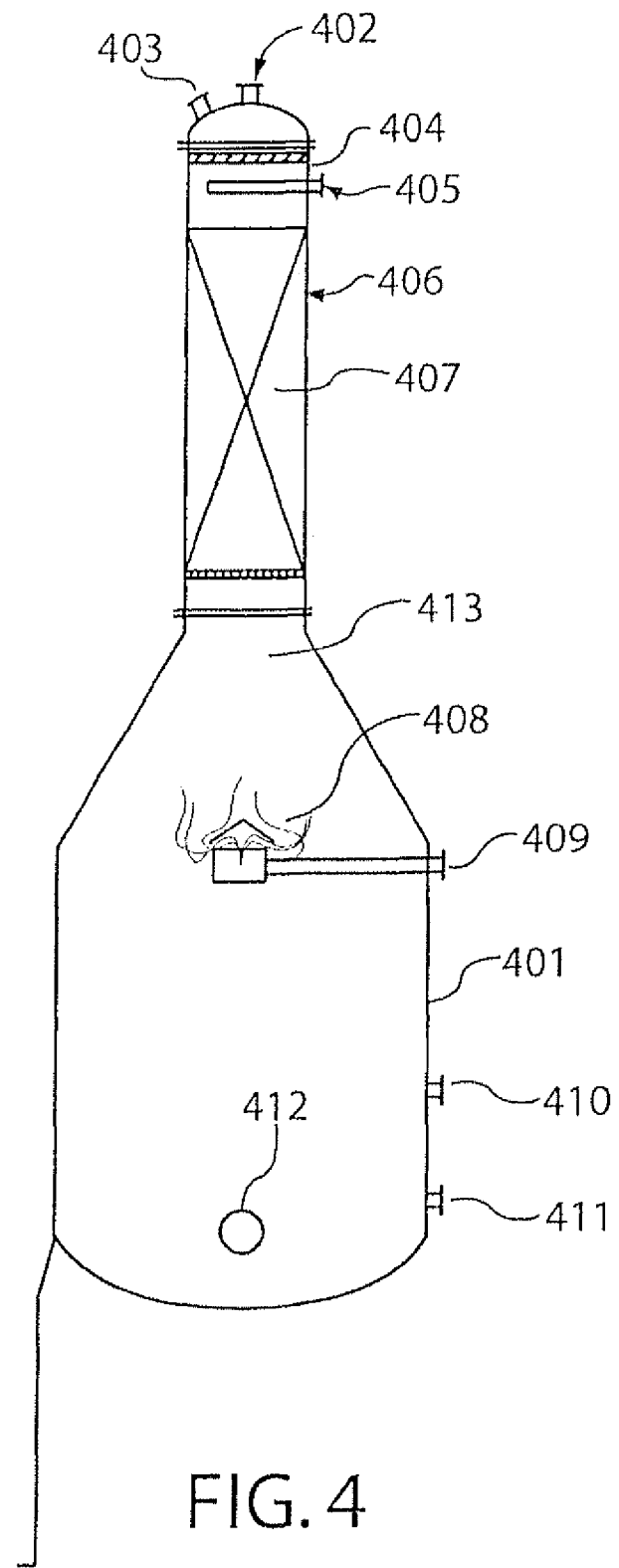
FIG. 4 illustrates an exemplary stripper implemented in accordance with the present invention.

FIG. 4 shows an exemplary stripper column 406 and stripper holding tank 401. The second aqueous ammonia solution is introduced into stripper 406 at spray nozzle 405, which disperses the solution down through packing material 407. This material forms multiple convoluted paths downward, maximizing the exposure of the second aqueous ammonia solution to the rising steam introduced at steam input 409, after which the steam is dispersed through steam grid 408. The steam rises (at 413) into packing material 407, where it mixes with the second aqueous ammonia solution to form the first aqueous ammonia solution and the first ammonia vapor. The first ammonia vapor passes up through de-mister 404 and through outlet 402 to reflux drum 264 of FIG. 2.

The first aqueous ammonia solution is output through outlet 412, where it either goes to reflux drum 264, or is returned via inlet 410 back into stripper holding tank 401. The first aqueous ammonia solution might be returned to stripper holding tank 401 if the ammonia level in the solution is too high to be reused as waste water and reflux drum 264 cannot handle more fluid volume for processing, for example. Inlet 411 is used as a return for check valve 233 of FIG. 2, in order to maintain the fluid level of stripper holding tank 401.

Figure 5:
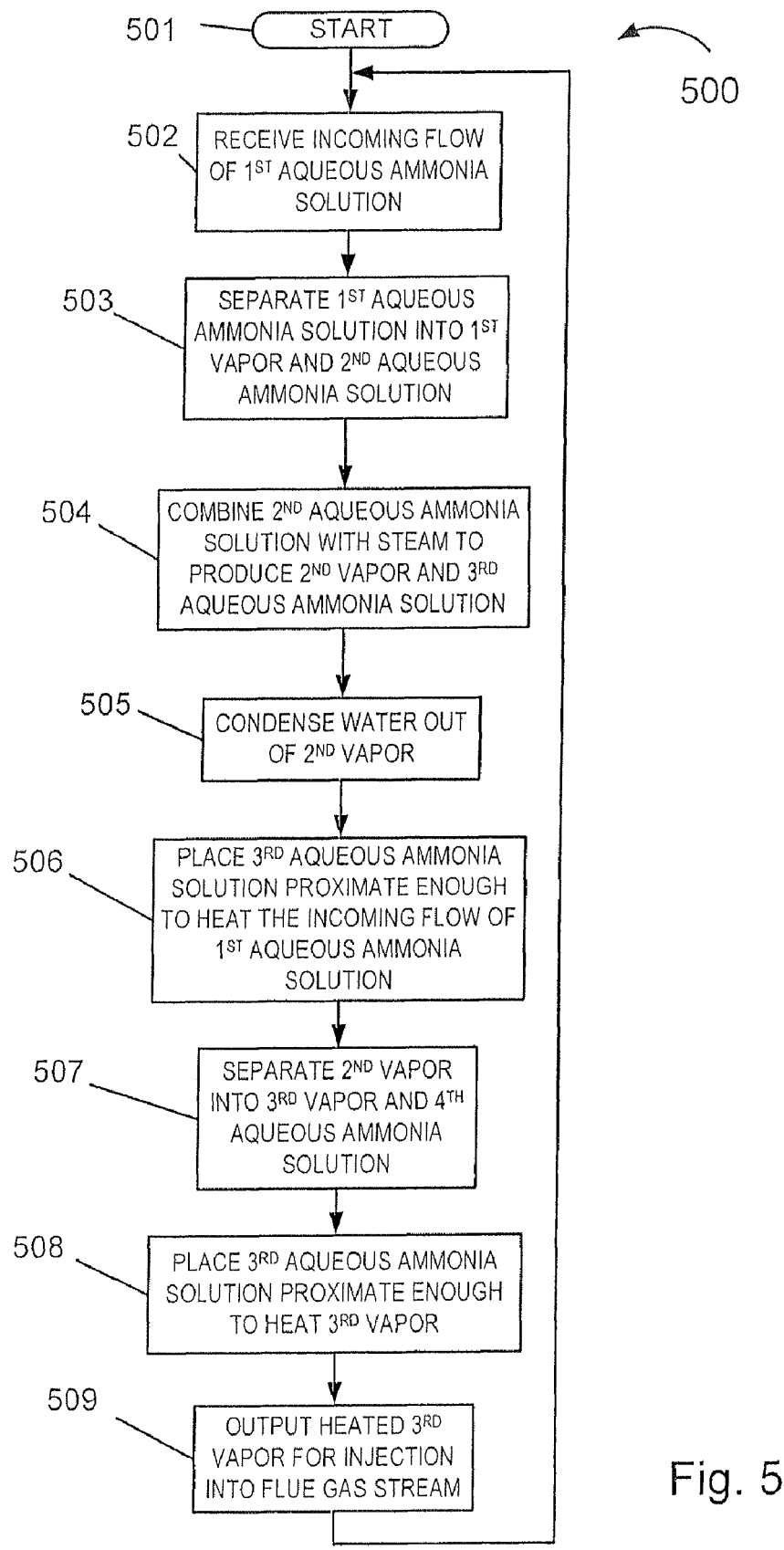
FIG. 5 is a flow diagram illustrating steps associated with practicing the present invention.

FIG. 5 shows the steps of a method 500 that can be taken in some embodiments of the present invention to utilize an aqueous ammonia solution to produce an ammonia vapor which is substantially free of water and a resultant aqueous ammonia solution which is substantially free of ammonia. This allows for the efficient removal of $NO_X$ from flue gases when injected into the flue gas stream, and the resultant nearly ammonia-free solution can be used for some normal purposes.

The method starts at step 501, and at step 502 a first aqueous ammonia solution is received (such as liquid aqueous ammonia). In step 503, the first aqueous ammonia solution is separated into a first ammonia vapor and a second aqueous ammonia solution, which contains less ammonia than the first aqueous ammonia solution. In step 504, the second aqueous ammonia solution is combined with steam to produce a second ammonia vapor which contains less water than the first ammonia vapor, and a third aqueous ammonia solution which contains less ammonia than the second aqueous ammonia solution.

In step 505, water is condensed out of the second ammonia vapor, resulting in an ammonia vapor with even less water content. In step 506, the third aqueous ammonia solution is used to transfer heat (that it received when exposed to steam in step 504) into the first aqueous ammonia solution. At start-up, the first aqueous ammonia solution would not be heated, but as the process progressed to step 506, newly inputted first aqueous ammonia solution in return step 502 would be heated, improving the separation process of step 503.

In step 507, the second ammonia vapor would be separated into a third ammonia vapor containing less water than the second ammonia vapor, and a fourth aqueous ammonia solution which would contain less ammonia than the third aqueous ammonia solution. In step 508, the third aqueous ammonia solution would also be used to transfer heat to the third ammonia vapor before the vapor is injected into the flue gas stream.

The process shown in FIG. 5 is performed on an ongoing basis as represented by the arrow going back to step 502.

Various steps and/or modules described herein may be implemented using software implemented on one or more processors. Accordingly, modules may be interpreted as being hardware, software, or a combination of hardware and software.

Numerous additional variations on the methods and apparatus of the present invention described above will be apparent to those skilled in the art in view of the above description of the invention. Such variations are to be considered within the scope of the invention.

What is claimed is:

1. An apparatus for producing vaporized ammonia suitable for introduction into flue gas, comprising:
  a source of aqueous ammonia for supplying liquid aqueous ammonia;
  a stripper for producing first ammonia vapor and a first aqueous ammonia solution from a second aqueous ammonia solution;
  a reflux tank for producing a second ammonia vapor and the second aqueous ammonia solution from the liquid aqueous ammonia, the first ammonia vapor, and the first aqueous ammonia solution; and
  a first outlet for outputting the second ammonia vapor for introduction into the flue gas.

2. The apparatus of claim 1, wherein the stripper further comprises:
  a heating input for receiving a heated fluid used to vaporize ammonia from the second aqueous ammonia solution.

3. The apparatus of claim 2, wherein the heated fluid is steam, the apparatus further comprising:
  a boiler for producing said steam.

4. The apparatus of claim 2, further comprising:
  a first heat exchanger positioned between a second vapor outlet of the reflux tank and said first outlet, for heating said second ammonia vapor.

5. The apparatus of claim 4, further comprising:
  a second heat exchanger positioned between an ammonia source and an inlet to said reflux tank for heating ammonia from said ammonia source.

6. The apparatus of claim 4, wherein said first aqueous ammonia solution is passed through said first heat exchanger to supply heat to said second ammonia vapor.

7. The apparatus of claim 6, further comprising:
  a second heat exchanger positioned between an ammonia source and an inlet to said reflux tank for heating ammonia from said ammonia source.

8. The apparatus of claim 7, wherein said first aqueous ammonia solution is passed through said second heat exchanger to supply heat.

9. The apparatus of claim 8, wherein said first and second heat exchangers are arranged in series in a first aqueous ammonia solution path extending between said stripper tank and a second inlet of said reflux tank.

10. The apparatus of claim 9, further comprising:
  a condenser located on said first aqueous ammonia solution path for condensing at least some water included in said first aqueous ammonia solution.

11. The apparatus of claim 9, further comprising:
  a low concentration ammonia solution output connected by a control valve to said first aqueous ammonia solution path.

12. The apparatus of claim 2, further comprising:
  a condenser located on said first aqueous ammonia solution path for condensing at least some water included in said first aqueous ammonia solution.

13. The apparatus of claim 1, further comprising:
  a condenser located in a second aqueous solution path extending between the stripper and the reflux tank for condensing at least some water in the first ammonia vapor.

14. An assembly for use in a power plant comprising:
  a fluid vaporization unit for vaporizing ammonia, the vaporization unit further comprising:
    a stripper for producing first ammonia vapor and a first aqueous ammonia solution from a second aqueous ammonia solution,
    a reflux tank for producing a second ammonia vapor and the second aqueous ammonia solution from the first ammonia vapor and the first aqueous ammonia solution, and
    a first outlet for outputting the second ammonia vapor for introduction into flue gas;
  a source of aqueous ammonia for delivering liquid aqueous ammonia to the reflux tank to be mixed with the first aqueous ammonia solution; and
  a flue containing the flue gas for receiving the second ammonia vapor from the vaporization unit for interaction with the flue gas.

15. The assembly of claim 14, further comprising:
  a selective catalytic reduction system in the flue to reduce the quantity of nitrogen oxides in the flue gas.

16. The assembly of claim 15, further comprising:
  a furnace coupled to the flue, wherein the furnace produces the flue gas and delivers the flue gas into the flue.

17. The assembly of claim 16, further comprising:
  a boiler coupled to the vaporization unit and the furnace for supplying steam to the stripper and producing heat for the operation of the furnace.

18. The assembly of claim 17, further comprising:
  a control module coupled to a sensor in the flue and further coupled to a control valve associated with the vaporization unit, wherein the sensor senses an attribute of the flue gas, and the control module, in response to the attribute, causes the control valve to adjust the amount of the second ammonia vapor delivered to the flue.

19. The apparatus of claim 1, wherein said stripper includes an aqueous ammonia input for receiving said second aqueous ammonia solution, a first ammonia vapor output for outputting said first ammonia vapor and a first aqueous ammonia solution output for outputting said first aqueous ammonia solution.

20. The apparatus of claim 19, wherein said first ammonia vapor output is positioned on said stripper above said first aqueous ammonia solution output.

21. The apparatus of claim 20, wherein said reflux tank includes an ammonia vapor output for outputting said second ammonia vapor and an aqueous ammonia solution output for outputting said second aqueous ammonia solution.

22. The apparatus of claim 21, wherein said reflux tank further includes an ammonia vapor input for receiving the first ammonia vapor and an aqueous ammonia solution input for receiving the first aqueous ammonia solution.

23. The apparatus of claim 2, wherein said heating input is a steam input.

24. A method of producing vaporized ammonia suitable for introduction into flue gas, the method comprising:

operating a source of aqueous ammonia to supply liquid aqueous ammonia;

operating a stripper to produce first ammonia vapor and a first aqueous ammonia solution from a second aqueous ammonia solution;

operating a reflux tank to produce a second ammonia vapor and the second aqueous ammonia solution from the liquid aqueous ammonia, the first ammonia vapor, and the first aqueous ammonia solution; and outputting the second ammonia vapor for introduction into the flue gas.

25. The method of claim 24, wherein the stripper further comprises:

receiving, at a heating input, a heated fluid used to vaporize ammonia from the second aqueous ammonia solution.

26. The method of claim 25, wherein the heated fluid is steam, the method further comprising:

operating a boiler to produce said steam.

* * * * *